United States Patent [19]

Snellgrove

[11] 4,423,026

[45] Dec. 27, 1983

[54] DENSIFICATION OF CAUSTIC MAGNESIA AND SINTERED PERICLASE BY ACID DOPING

[75] Inventor: Richard A. Snellgrove, Cherry Hill, N.J.

[73] Assignee: General Refractories Company, Bala Cynwyd, Pa.

[21] Appl. No.: 142,659

[22] Filed: Apr. 22, 1980

[51] Int. Cl.$^3$ .............................................. C01F 5/08
[52] U.S. Cl. ..................................... 423/636; 501/108
[58] Field of Search ......................... 106/58; 423/636; 501/108

[56] References Cited

U.S. PATENT DOCUMENTS

| | | | |
|---|---|---|---|
| 222,224 | 12/1879 | Althans et al. | 106/58 |
| 1,881,283 | 10/1932 | Lukens | 423/636 |
| 2,478,593 | 8/1949 | Pike | 423/636 |
| 3,060,000 | 10/1962 | Snyder et al. | 423/636 |
| 3,302,997 | 2/1967 | Heuer | 423/636 |
| 3,378,615 | 4/1968 | Zisner | 423/636 |
| 3,475,188 | 10/1969 | Woodhouse et al. | 106/58 |
| 3,573,079 | 3/1971 | Shibasaki et al. | 106/58 |
| 3,598,618 | 8/1971 | Fujii et al. | 106/40 R |
| 4,033,778 | 7/1977 | Gilpin et al. | 106/58 |
| 4,126,478 | 11/1978 | Bowman | 106/58 |

*Primary Examiner*—Edward J. Meros
*Assistant Examiner*—Wayne A. Langel
*Attorney, Agent, or Firm*—Everett H. Murray, Jr.; Brian G. Brunsvold; Thomas L. Irving

[57] ABSTRACT

A method for improving the density and other properties of caustic magnesia and sintered periclase. To improve the density of sintered periclase, acid or acid salt is admixed with magnesium hydroxide, followed by caustic-firing, pressing and high-firing. If desired, the admixture is dried before caustic-firing. Alternatively, the step of caustic-firing may be omitted. To improve the density and compactability of caustic magnesia, acid or acid salt is admixed with magnesium hydroxide, followed by caustic-firing. If desired, the admixture is dried before caustic-firing. Preferably, acetic acid is used.

13 Claims, No Drawings

DENSIFICATION OF CAUSTIC MAGNESIA AND SINTERED PERICLASE BY ACID DOPING

BACKGROUND OF THE INVENTION

The present invention relates generally to a method of improving both caustic and high-fired properties of magnesia. Specifically, the invention is directed to improving the compactability of caustic magnesia and the density of high-fired magnesia.

High-fired magnesia (MgO), known and hereinafter referred to as sintered periclase, forms the principal constituent of magnesia brick. To increase its refractory effectiveness it is desirable to maximize its density. High density of sintered periclase is promoted by high and uniform green density of the precursor caustic compacts. Further, production costs of periclase can be reduced by more efficient compaction and lowered calcining temperatures for the precursor caustics.

Properties of caustics prepared according to prior art show a very strong dependence on the caustic calcining temperature. Generally, reasonable compaction is achieved only for high calcining temperatures between 900°-1000° C. These high temperatures are costly both in terms of energy and kiln maintenance. Further, because small variations in calcining temperature may cause considerable variation in caustic properties, briquetting efficiency and green density of the briquettes are often either too low or too variable. Therefore, it has been necessary to carefully control caustic-firing temperatures.

Irrespective of caustic properties, density of sintered periclase may be quite sensitive to variations in high-firing temperature. Particularly, in the lower range of high-firing temperatures, such as 1300°-1600° C., resultant sintered density is generally lower than that achieved at higher temperatures. Thus, as with caustic-firing, carefully-controlled higher temperatures, accompanied by increased energy consumption, have been necessary.

Some sources of $Mg(OH)_2$, having certain impurity levels, have invariably yielded sintered periclase grain of an average grain size between 9–13$\mu$. For effective refractory use, however, sintered periclase particles must have an average grain size of about 25–30$\mu$. Therefore, it has heretofore been impractical to use such $Mg(OH)_2$ sources in processes for producing sintered periclase from $Mg(OH)_2$.

As an effective solution to the above-mentioned problems, the present invention promotes the growth of symmetrical single crystals of MgO, weakens the bonding of agglomerates in the caustic, and alters the morphology of the caustic. As a result of these fundamental changes in crystallinity, superior properties are obtained for both caustic magnesia and sintered periclase.

Compaction of the caustic is facilitated by powder density being independent of calcining temperature, by a reduced need for hot briquetting or lubricating aids, and by greater cohesiveness of briquettes. Higher values of green density are obtained, especially at lower calcining temperatures. Higher fired densities can be obtained and grain growth increased at lower firing temperatures. Better results are also obtained in the direct high firing of magnesium hydroxide. Additionally, the invention is inexpensive, non-toxic and does not alter the composition of sintered periclase.

SUMMARY OF THE INVENTION

The present invention, overcoming the problems an disadvantages of the prior art, relates to a method for improving the production and properties of sintered periclase comprising the steps of: (a) forming an admixture of $Mg(OH)_2$ and an acid, or salt thereof, selected from the group consisting of acetic acid, benzoic acid and hydrochloric acid, wherein the amount of acid or salt is from about 0.1 mole percent to 2 mole percent relative to the $Mg(OH)_2$; (b) caustic-firing the admixture at a temperature between about 500° C. and 1050° C. for a period of time from about 1 to 24 hours; (c) pressing the caustic-fired admixture into compacts; and (d) high-firing the pressed compacts at a temperature between about 1300° C. and 1900° C. for a period of time from about 1 to 10 hours.

One of the cost-reducing advantages of the inventive method is that small amounts of acid or salt relative to $Mg(OH)_2$ can be used. Specifically, an acid or salt is effective if added in an amount less than about 1 mole percent relative to $Mg(OH)_2$. Another advantage of the invention is that caustics produced thereby are much more likely to compact satisfactorily without the use of high temperatures or multiple passes during briquetting, further reducing cost and saving time. Temperatures of the calcining and firing kilns, moreover, can be reduced to save energy.

Preferably, the method uses aqueous acid and an aqueous slurry of $Mg(OH)_2$. Most preferably, the acid chosen is acetic acid.

Because admixture compacts are less likely to crack when fired directly to high temperatures, the invention is further directed to a method for improving the densification of sintered periclase comprising: (a) forming an admixture of $Mg(OH)_2$ and an acid, or salt thereof, selected from the group consisting of acetic acid, benzoic acid and hydrochloric acid, wherein the amount of acid or salt is from about 0.1 mole percent to 2 mole percent relative to the $Mg(OH)_2$; (b) drying the admixture if necessary to an appropriate moisture content; (c) pressing the admixture into compacts; and (d) high-firing the pressed compacts at a temperature between about 1300° C. and 1900° C. for a period of time from about 1 to 10 hours.

Because caustic morphology is changed by addition of the acid or salt thereof to $Mg(OH)_2$, the invention further includes a method for improving the production and properties of caustic magnesia which comprises the steps of: (a) forming an admixture of $Mg(OH)_2$ and an acid or salt thereof selected from the group consisting of acetic acid, benzoic acid, and hydrochloric acid, wherein the amount of acid or salt is from 0.1 mole percent to 2 mole percent relative to the $Mg(OH)_2$; and (b) caustic-firing the admixture at a temperature between about 500° C. and 1050° C. for a period of time from about 1 to about 24 hours. If desired, the admixture is dried to an appropriate moisture content, less than about 50 percent, before caustic-firing.

DESCRIPTION OF THE PREFERRED EMBODIMENTS

Reference will now be made in detail to the presently preferred embodiments of this invention. To achieve the purposes of the invention, $Mg(OH)_2$ of impurity levels represented in Table 1 have been found suitable; however, it will be obvious to the skilled artisan that $Mg(OH)_2$ containing even greater or smaller levels of impurities may be employed to achieve the teachings of the invention.

TABLE 1

| | Weight Percent on MgO Basis | | | |
|---|---|---|---|---|
| | (A) | (B) | (C) | (D) |
| CaO | 0.49 | 1.98 | 0.43 | 0.33 |
| $SiO_2$ | 0.58 | 0.56 | 0.07 | 0.07 |
| $Fe_2O_3$ | 0.15 | 0.06 | 0.02 | 0.01 |
| $Al_2O_3$ | 0.16 | 0.01 | 0.01 | 0.02 |
| $B_2O_3$ | 0.19 | 0.022 | 0.003 | 0.0008 |

As presently contemplated, the most effective acid for achieving the purposes of the invention is acetic acid. Hydrochloric and benzoic acids also work well. Magnesium salts of these acids, such as magnesium acetate, or, if additional properties are desired, acid salts of another appropriate metal are also effective. The amount of acid or salt in mole percent relative to the $Mg(OH)_2$ may vary from about 0.1% to 2%, but amounts less than about 0.5 mole % relative to $Mg(OH)_2$ are generally sufficient.

Preferably, glacial acetic acid is used in concentrations ranging from 0.2 w/o to about 0.6 w/o. For the purposes of this specification, an expression such as "0.6 w/o glacial acetic acid" means 0.6% by weight of concentrated acetic acid in an admixture of $Mg(OH)_2$ and concentrated acetic acid. The expression does not include, however, the weight of water when the $Mg(OH)_2$ is admixed as a slurry. Although the $Mg(OH)_2$ may be utilized in the present invention in solid form, an aqueous slurry is preferred.

Admixing $Mg(OH)_2$ with an acid or salt thereof is hereinafter sometimes referred to as acid-doping to conveniently distinguish the invention from methods of the prior art. The $Mg(OH)_2$ an acid salt may be mixed as dry powders but mixing is best achieved when concentrated acid is mixed with a $Mg(OH)_2$ slurry just prior to the caustic-firing or high-firing. The acid should be thoroughly distributed in the $Mg(OH)_2$. A few minutes stirring will suffice for a thin slurry.

After formation, the admixture is caustic-fired at a temperature between about 500° C. and 1050° C. for a period of time from about 1 to 24 hours by means well-known and readily available. The caustic-fired admixture is then pressed into compacts or briquettes of caustic-fired magnesia in a die or briquetting machine at pressures typically exceeding 10,000 pounds per square inch (psi). If caustic-firing is omitted, identical means are nonetheless used to press the admixture into compacts.

Drying admixtures of acid or acid salt with very thin slurries of $Mg(OH)_2$ may be desirable before caustic-firing. If so, the admixture is preferably dried to a moisture content less than about 50 percent. If filtration is used to remove liquid, however, allowance must be made for acid lost in this liquid.

After pressing, the compacts are transferred to a suitable apparatus for high-firing, such as a kiln. The compacts are then high-fired at a temperature between about 1300° C. and 1900° C. for a period of time from about 1 to 10 hours to obtain sintered periclase.

The invention will be further clarified by the following examples. Other embodiments of the invention will be apparent to those skilled in the art from both consideration of the specification and practice of the invention as disclosed herein.

EXAMPLE 1

$Mg(OH)_2$ slurries of composition (A) (Table 1), were each acid-doped with 0.62 w/o glacial acetic acid. After drying, the individual admixtures were caustic-fired at temperatures between 500° C. and 1050° C. Regardless of firing temperature, the bulk density (weight of gently poured powder divided by its volume) of each caustic was a constant $0.31 \pm 0.01$ g/cm$^3$. By contrast, for undoped caustics of composition (A) fired in the same temperature range, bulk powder density varied between 0.29 and 0.38 g/cm$^3$.

EXAMPLE 2

The doped and undoped caustics of Example 1 were each pressed into compacts at 10,000 psi using 3 percent by weight water as a lubricant. The green density of each resultant compact was computed from its geometric volume and weight. As tabulated in Table 2, the green densities for the doped caustics were both temperature independent and higher than for the undoped caustics.

TABLE 2

| | Green Densities (g/cm$^3$) at the Indicated Caustic Temperatures | | | |
|---|---|---|---|---|
| Composition | 500° C. | 680° C. | 870° C. | 1050° C. |
| $Mg(OH)_2$ Slurry | 1.21 | 1.43 | 1.74 | 1.72 |
| $Mg(OH)_2$ Slurry + 0.62 w/o acetic acid | 1.78 | 1.76 | 1.78 | 1.79 |

EXAMPLE 3

Two slurries of $Mg(OH)_2$ of composition (A) (Table 1) were each admixed with 0.45 w/o concentrated HCl. After drying, each admixture was caustic-fired and compressed at 10,000 psi, after which green density was measured as in Example 2. Table 3 compares doped green density to that of the Example 2 undoped caustics. The green density of the acid-doped caustics is both higher and less dependent on caustic temperature.

TABLE 3

| | Green Densities (g/cm$^3$) at the Indicated Caustic Temperatures | |
|---|---|---|
| Composition | 500° C. | 870° C. |
| $Mg(OH)_2$ Slurry | 1.21 | 1.74 |
| $Mg(OH)_2$ Slurry + 0.45 w/o conc. HCl | 1.69 | 1.79 |

EXAMPLE 4

Slurries of $Mg(OH)_2$ of composition (C) (Table 1) were each admixed with 0.62 w/o acetic acid. After drying, and caustic-firing, compacts were pressed without a lubricant at 10,000 psi. Undoped slurries of $Mg(OH)_2$ which were dried and caustic-fired failed to form good compacts without adding 3 w/o water as a lubricant. Green densities were measured as in Example 2. As demonstrated in Table 4, green density for acid-doped caustics is both higher and less sensitive to temperature variation.

TABLE 4

| Composition | Green Densities (g/cm³) at the Indicated Caustic Temperatures | | | |
|---|---|---|---|---|
| | 500° C. | 680° C. | 870° C. | 1050° C. |
| Mg(OH)₂ Slurry | 1.40 | 1.62 | 1.74 | 1.77 |
| Mg(OH)₂ Slurry + 0.62 w/o acetic acid | 1.97 | 1.86 | 1.77 | 1.81 |

EXAMPLE 5

Slurries of Mg(OH)₂ of composition (D) (Table 1) were each acid-doped with either 0.21 w/o acetic acid or 1.21 w/o benzoic acid, while identical slurries were not acid-doped. After drying and caustic-firing all samples of 870° C., each compact was pressed without lubrication, followed by high firing for about 3.5 hours at a temperature ranging from 1400° C. to about 1600° C. The density of each sintered periclase sample was measured by a standard buoyancy method using xylene and the measurements are reported in Table 5. Sintered densities for acid-doped samples are higher and also less sensitive to temperature variations.

TABLE 5

| Composition | Fired Densities After 3.5 Hours At Indicated Temperature | | |
|---|---|---|---|
| | 1400° C. | 1500° C. | 1600° C. |
| 870° Caustic of Mg(OH)₂ Slurry + 0.21 w/o acetic acid | 3.39 | 3.43 | 3.44 |
| 870° Caustic of Mg(OH)₂ Slurry + 1.22 w/o benzoic acid | 3.41 | 3.43 | 3.44 |
| 870° Caustic of Mg(OH)₂ Slurry | 3.00 | 3.25 | 3.37 |

EXAMPLE 6

Slurries of Mg(OH)₂ of composition (D) (Table 1) were each acid-doped with 0.64 w/o acetic acid, while identical slurries of Mg(OH)₂ were not so doped. After drying and caustic-firing all samples at 500° C., each compact was pressed without lubrication, followed by high-firing at temperatures ranging from about 1400° C. to about 1600° C. for about 3.5 hours. Density measurements of the resultant sintered periclase samples, obtained as in Example 5, are presented in Table 6. The results indicate improved densities less sensitive to temperature variation for sintered periclase produced from doped slurries of the present invention. Further, compared with the results at higher temperatures in Table 5, acid doping gives especially dramatic improvement in the density of sintered periclase produced at relatively low caustic and high-firing temperatures, such as 500° C. and 1400° C. which were utilized in this Example.

TABLE 6

| Composition | Fired Densities After 3.5 Hours At Indicated Temperature | | |
|---|---|---|---|
| | 1400° C. | 1500° C. | 1600° C. |
| 500° Caustic of Mg(OH)₂ Slurry + 0.64 w/o acetic acid | 3.39 | 3.43 | 3.46 |
| 500° Caustic of Mg(OH)₂ Slurry | 2.53 | 3.12 | 3.25 |

EXAMPLE 7

In most cases periclase grain produced from high-firing at 1650° C. for 3.5 hours has an average grain size of 25–30μ. It is known, however, that periclase grain produced from non-doped Mg(OH)₂ slurries of composition (B) and (C) (Table 1) have sintered periclase average grain sizes of 9 and 13μ respectively, which are too small for effective refractory use. Mg(OH)₂ slurries of compositions (B) and (C) were each admixed with 0.6 w/o acetic acid, followed by drying, caustic-firing, pressing and high-firing at 1650° C. for 3.5 hours. The average grain size of the sintered periclase was measured to be 25μ. Accordingly, the inventive method renders such readily available Mg(OH)₂ compositions as (B) and (C) useful for the production of sintered periclase.

EXAMPLE 8

A slurry of Mg(OH)₂ composition (D), containing about 20 w/o water was admixed with 0.3 w/o concentrated acetic acid, diluted five-fold with water. This admixture was caustic-fired for 1 hour at 700° C. A slurry of Mg(OH)₂ composition (D), containing about 20 w/o water which was not acid-doped was also caustic-fired for 1 hour at 700° C. Both acetic acid-doped and undoped caustic were briquetted with a lab press having almond shaped molds of about 5 cc volume. Operating pressure was 200 kP/cm³, material temperature was 470° to 700° C. and roll temperature was 280°–300° C. After each briquetting stage the +10 mm fraction was screened out and the −10 mm was briquetted again. The properties of the 700° C. calcined caustics are compared in Table 7.

TABLE 7

| | Undoped | Doped |
|---|---|---|
| Green Density (g/cm³) | 1.69 | 1.97 |
| Fired Density (g/cm³) | | |
| for 1650° Fire | 3.26 | 3.44 |
| for 1750° Fire | 3.29 | 3.43 |
| % Briquettes > 10 mm | | |
| for one pass | 17 | 31 |
| for two passes | 35 | 57 |

Acid-doping in accordance with the present invention thus results in improved green density, fired density and briquette integrity.

What is claimed is:

1. A method for improving the production and densification of sintered periclase comprising:
    (a) forming an admixture of Mg(OH)₂ and an acid or salt thereof selected from the group consisting of acetic acid, benzoic acid and hydrochloric acid, wherein the amount of acid or salt is from about 0.1 mole percent to 2 mole percent relative to said Mg(OH)₂;
    (b) caustic-firing said admixture at a temperature between about 500° C. and 1050° C. for a period of time from about 1 to 24 hours.
    (c) pressing said caustic-fired admixture into compacts; and
    (d) high-firing said pressed compacts at a temperature between about 1300° C. and 1900° C. for a period of time from about 1 to 10 hours.

2. The method of claim 1 wherein said salt is a magnesium salt.

3. The method of claim 2 wherein said salt is magnesium acetate.

4. The method of claim 1 wherein said $Mg(OH)_2$ is added as a solid.

5. The method of claim 1 wherein said $Mg(OH)_2$ is added as an aqueous slurry.

6. The method of claim 1 wherein said admixture is dried to a moisture content of less than about 50 percent.

7. The method of claim 1 wherein said acid is acetic acid.

8. A method for improving the densification of sintered periclase comprising:
   (a) forming an admixture of $Mg(OH)_2$ and an aqueous acid or salt thereof selected from the group consisting of acetic acid, benzoic acid and hydrochloric acid, wherein the amount of acid or salt is from about 0.1 mole percent to 2 mole percent relative to said $Mg(OH)_2$;
   (b) pressing said admixture into compacts; and
   (c) high-firing said pressed compacts at a temperature between about 1300° C. and 1900° C. for a period of time from about 1 to 10 hours to obtain sintered periclase of high density.

9. The method of claim 8 further including the step of drying said admixture to a moisture content of less than about 50 percent.

10. A method for improving the properties of caustic magnesia comprising:
    (a) forming an admixture of $Mg(OH)_2$ and an acid or a salt thereof selected from the group consisting of acetic acid, benzoic acid, and hydrochloric acid, wherein the amount of acid or salt is from about 0.1 mole percent to 2 mole percent relative to said $Mg(OH)_2$;
    (b) caustic-firing said admixture at a temperature between about 500° C. and 1100° C. for a period of time from about 1 to 24 hours to obtain caustic magnesia of high density.

11. The method of claim 10 further including the step of drying said admixture to a moisture content of less than about 50 percent.

12. The method of claim 10 wherein said $Mg(OH)_2$ is added as an aqueous slurry.

13. The method of claim 10 wherein said $Mg(OH)_2$ is added as a solid.

* * * * *